United States Patent
Schoeppe

(10) Patent No.: US 6,731,390 B2
(45) Date of Patent: May 4, 2004

(54) PROCESS AND APPARATUS FOR DETERMINING SURFACE INFORMATION USING A PROJECTED STRUCTURE WITH A PERIODICALLY CHANGING BRIGHTNESS CURVE

(75) Inventor: Guenter Schoeppe, Kunitz (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/218,556

(22) Filed: Aug. 13, 2002

(65) Prior Publication Data

US 2003/0090680 A1 May 15, 2003

Related U.S. Application Data

(63) Continuation-in-part of application No. 09/607,644, filed on Jun. 30, 2000, now abandoned.

(30) Foreign Application Priority Data

Jul. 1, 1999 (DE) .......................................... 199 30 816

(51) Int. Cl.[7] .............................................. G01B 11/24
(52) U.S. Cl. ....................................................... 356/604
(58) Field of Search ................................. 356/601–622

(56) References Cited

U.S. PATENT DOCUMENTS

| | | | |
|---|---|---|---|
| 4,884,881 A | * 12/1989 | Lichtman et al. | 359/227 |
| 5,307,153 A | * 4/1994 | Maruyama et al. | 356/604 |
| 5,471,308 A | 11/1995 | Zeien | |
| 5,493,400 A | 2/1996 | Gröbler et al. | |
| 5,831,736 A | 11/1998 | Lichtman et al. | |

FOREIGN PATENT DOCUMENTS

| | | |
|---|---|---|
| WO | WO 9706509 | 2/1999 |
| WO | WO 9845745 | 12/1999 |

* cited by examiner

*Primary Examiner*—Hoa Q. Pham
(74) *Attorney, Agent, or Firm*—Reed Smith LLP

(57) ABSTRACT

A process is disclosed for determining surface information by a projected structure with periodically changing brightness curve which is shifted by 1/n, n=whole number greater than two, of the grating constant, and the projection image is acquired of a CCD camera, and information is determined for every image point, which information represents the brightfield intensity multiplied by the respective grating phase, the sine components and cosine components are extracted from these images and gives:

I. $I_{xy} = I_{obxy} * m * \sin x$

II. $I_{xy} = I_{obxy} * m * \cos x$, where $$m = \frac{I_{obxy} * \sqrt{\sin^2 x + \cos^2 x}}{I_{obxy}}$$

and the modulation factor m is calculated from I. and II. and is used for representation, An arrangement is also disclosed for changing the projection direction of a grating which is projected on a surface via at least one wedge-shaped prism body which is rotatable about the optical axis and a parallel plate which is tiltable relative to the optical axis, wherein the control of the tilting movement of the parallel plate is coupled with the rotational movement of the prism body in such a way that a change in the orientation of the prism body is carried out after at least three tilting steps.

5 Claims, 3 Drawing Sheets

PROCESS AND APPARATUS FOR DETERMINING SURFACE INFORMATION USING A PROJECTED STRUCTURE WITH A PERIODICALLY CHANGING BRIGHTNESS CURVE

This is a continuation-in-part application of application Ser. No. 09/607,644 filed Jun. 30, 2000 now abandoned, the disclosure of which is hereby incorporated by reference, which claims foreign priority under 35 U.S.C. §119 to German application 199 30 816.0 filed Jul. 1, 1999, priority to which is also claimed herein.

BACKGROUND OF THE INVENTION a) Field of the Invention

The invention relates to a process and device for depth selection in microscope images.

b) Description of the Related Art

It is known to carry out depth measurements in microscope images as well as to suppress image portions located outside of the focal plane by means of structured illumination (AXIOMAP by ZEISS, WO 97/06509, WO 98/45745).

In U.S. Pat. No. 5,493,400 (DE 9308486U), an inclined grating projection is generated by means of wedge-shaped glass bodies with changeable orientation.

These methods are based on methods derived from interference microscopy in which periodic structures projected in the object plane are converted to interference patterns and evaluations which are made possible in this way are carried out.

For this purpose, gratings are imaged in the object planes and displaced by integral fractions of the grating constant either continuously over a certain period of time (phase shift method) or stepwise (phase step method). An image is acquired in every time interval or of every position of the grating by means of a pixel-synchronous CCD camera and the images are calculated together.

The conditions are assessed most simply when a grating with a $\cos^2$-shaped or $\sin^2$-shaped intensity variation is shifted three times by ¼ grating constant in the direction of the grating periodicity, e.g., in the x-direction. (The method functions in principle with shifts by each integral fraction <½ of the grating constant).

The image of the initial position is interpreted as an image with sinusoidal intensity modulation vertical to the direction of the grating bar or line (sin x), the next as cos x, and the following as $-\sin x$ and the last as $-\cos x$.

Therefore, information is provided for every image point representing the brightfield intensity multiplied by the respective grating phase. Further relevant information can be derived from this output data.

The four images can be described as follows:

1. $I_{xy1} = 0.5 I_{obxy} * (1 + m * \sin x)$
2. $I_{xy2} = 0.5 I_{obxy} * (1 + m * \cos x)$
3. $I_{xy3} = 0.5 I_{obxy} * (1 - m * \sin x)$
4. $I_{xy4} = 0.5 I_{obxy} * (1 - m * \cos x)$, where $I_{obxy}$ is the intensity (reflectivity, transmission, fluorescence) contributed by the object location x, y to the imaging, and m is the modulation factor of the grating imaging. Subtracting 3 from 1 and 4 from 2 gives:

I. $I_{xy} = I_{obxy} * m * \sin x$

II. $I_{xy} = I_{obxy} * m * \cos x$.

Like components vanish with this procedure.

Conversely, by adding 3 to 1 and 4 to 2, the modulation of the image content with the angle functions vanishes in both cases. Brightfield images $A_1$ and $A_2$ are obtained:

$A_1$: $I_{xy} = I_{yx3} + I_{xy1} = I_{obxy}$,
$A_2$: $I_{xy} = I_{xy4} + I_{xy2} = I_{obxy}$.

i.e., two complete brightfield images are contained in these four partial images.

The modulation m with the angle functions has impressed information on these images about the distance from the exact focal plane. The modulation factor m of the grating imaging changes depending on the utilized grating constant, objective aperture, wavelength and the distance from the focal plane.

When using an objective, a light source and a grating, the first influencing factors remain constant, i.e., the modulation factor in a given arrangement is a function of focusing.

This modulation factor multiplied by the brightfield information can be calculated from I. and II. by means of Pythagorean trigonometry by individual squaring followed by addition:

$$m = \frac{I_{obxy} * \sqrt{\sin^2 x + \cos^2 x}}{I_{obxy}}$$

When m is taken solely as a function of location, a "distance image" of the image points from the optimum focal plane is obtained. Omitting division by the brightfield image, information is obtained which is virtually identical to that which can be obtained in confocal microscopes. The object characteristics are presented with decreasing intensity as the distance from the object plane increases, i.e., a determined layer of the object is shown.

Since the modulation factor $m \leq 1$, the depth selectivity can be increased by raising to a higher power.

By means of selecting limits, setting threshold values for display, it is possible to represent a layer of varying thickness by itself in a synthetic image in that everything located at a distance from the focus is excluded from the display by the threshold values.

This possibility is limited by the signal/noise ratio, the step errors in the grating displacement, the nonlinearities in detection, and the number of nodes by which the modulated grating is represented by the CCD camera generally used.

In principle, the following information can be obtained from the object from the partial images described above:

1. Complete brightfield images without modulated grating structure ($A_1$, $A_2$);
2. Distance information of object areas from the exact focus (without direction) (m);
3. Brightfield information of object becoming darker with increasing distance from the focus (confocal images) (A*m);
4. Images in which only a thin layer around the focus is shown as a complete brightfield image (A where m>limit value);
5. By raising m to a higher power, a selectable smaller area around the focus.

The apparatus described in U.S. Pat. No. 4,884,881 is an arrangement belonging to the large group of spinning disk arrangements, as they are called. These arrangements require an intermediate imaging (Relaigh) system. This means that the microscope must be expanded by additional optics and accordingly rendered more expensive.

In order to achieve usable confocal effects in arrangements with a spinning disk, structures must be projected into the object plane in such a way that they have a size in that location which is comparable to the resolution limit of the arrangement. Further, the coverage of a structured mask should be no larger than 5% in order to suppress the "breaking through" of information located outside of the focal plane. This precaution leads to a very low light yield or light efficiency (≦5%). In the this patent, wedge-shaped slits are imaged in the object plane. As a result of this construction, the confocal effect varies in radial direction (with respect to the image of the disk). In the present invention, because of the $\cos^2$-$(\sin^2)$-shaped intensity distribution of the pattern, the light efficiency is almost 50% and the achievable confocal effect is not spatially dependent in the displayed field. The device can be added to any reflected-light microscope or fluorescence microscope with an accessible field diaphragm plane in the illumination beam path without requiring additional optics.

U.S. Pat. No. 5,831,736 describes a confocal laser scanning microscope in which not all of the radiation returning from the object is detected, but only an angular area limited to the pupil plane. This area is cut out by a sector diaphragm whose direction can be changed in a stepwise manner. Based on the waveform of the detected signal depending on the orientation of the sector diaphragm, spatially dependent information about the inclination of the object structures can be obtained in addition to the depth information that can be obtained in microscopes of this type; however, because of the reduced aperture on the detection side, this information is obtained with decreased lateral and depth resolution.

In U.S. Pat. No. 5,471,308 plane plates with different inclinations are slid or rotated into the beam path of the projector successively in front of a grating pattern so that a different position of the projected pattern occurs with every one of the inclined plane plates (described in optics texts as plane plate micrometer). The apparatus described in the patent has two disadvantages:

1. Because of the large paths to be traveled and the large masses to be moved, the changing of the plates is carried out too slowly for modern applications.
2. Different optical parts are used which are subject to tolerances. In critical applications, this leads to errors which cannot be compensated in practice.

The aim of the apparatus described in U.S. Pat. No. 5,307,153 differs from that of the present invention. This apparatus is concerned with changing the grating constant of a pattern. The patent makes use of Abbe's theory of imaging and simulates what was realized by Abbe with his diffraction apparatus for demonstrating microscope imaging theory. Changing the grating constant in depth measurement with structured illumination, as it is called, is required in order to enlarge the detectable depth range in macroscopic objects.

The arrangements described in both of the above-mentioned patents suffer from a common disadvantage. In order to detect the depth of objects, the parallax must be used, i.e., the pattern must be projected with inclined principal beam direction. It has been shown that surfaces which are inclined toward the observation direction are reproduced in a distorted manner with this method. This disadvantage can be compensated with simple objects, but not with complicated ones. Errors of this type can be compensate almost completely with projection from two directions at an inclination opposite to the observation axis.

The arrangements of U.S. Pat. No. 5,493,400 shown in FIGS. 4 and 5 are used for this purpose. The disadvantage of the arrangements shown in this reference consists in that the change in the projection direction requires an independent drive and large paths must be traveled and large masses must be moved. Therefore, the attainable speeds do not meet modern requirements.

OBJECT AND SUMMARY OF THE INVENTION

With central illumination, the images contain no information about whether an image point lying outside of the focal plane is extrafocal or intrafocal. It is possible, however to obtain this information through oblique grating projection in an advantageous manner and a principal object of the present invention is directed to this approach.

Depending on the object height, the grating lines are shifted more or less in the direction of incidence of the illumination.

Phase information $\phi_{xy}$ by pixel can be obtained from the above equations I. and II. by division analogous to examination by interference microscopy.

$$\varphi_{xy} = \arctan\frac{\sin x}{\cos x}.$$

In so doing, the modulation factor and object intensity vanish. Therefore, it can be decided whether the respective pixel is located above or below the focal plane. It can be decided, based on the mathematical sign of p, whether the respective pixel lies above or below the focal plane. Whether a positive sign signifies above or below, and vice versa, depends on given technical factors pertaining to equipment.

Experience has shown that reconstruction algorithms for the surface profile exhibit errors or fail entirely especially in the case of highly structures objects when there are areas with low modulation or without modulation.

This last circumstance can be countered in that four images are obtained for illumination with opposite incidence. Projection-dependent distortion is compensated by adding the synthetic images.

The phase itself is not determined, but rather the mutual position of the grating lines through comparison of their position in the first quartet of images with their position in the second. In so doing, it is advantageous to determine the modulation factor in addition and to exclude from representation by mathematical means those areas whose modulation lies below a determined threshold.

If the lines of the grating in image $A_1$ are shifted in a certain direction compared with image $A_2$, this also signifies a direction of defocusing conditioned by factors caused by the arrangement.

In contrast to known algorithms, this procedure also enables examination of objects that are extremely structured and/or expanded in depth and, in connection with the fine adjustment available in the microscope, by acquiring images of the object from different planes, enables the three-dimensional reconstruction of such objects.

The use of oblique illumination has further advantages for depth selectivity and lateral resolution of the image. Oblique grating projection has a further advantage in case of uniformly reflecting surfaces with inclined faces.

By means of reflection, the returning information is reflected back by twice the angle of inclination of the surface elements. When using objectives with very high apertures, this also leads to a limiting of inclined areas capable of examination to ≦36°. By means of oblique projection, the usable inclination range in the methods mentioned above which do not distinguish between the intrafocal and extrafocal position of object details can be expanded by the projection angle differing by 90°.

In the AXIOMAP, a slide with a grating with $\cos^2$-shaped intensity variation could be inserted into the field diaphragm plane. The grating was displaced by a stepper motor.

A switchable carrier with two identical wedges, but with opposite orientation, was arranged between the grating and the aperture diaphragm. The inclination of illumination could be changed in this way.

A disadvantage in this method was the long switching time from one state to another. There was also no possibility of central illumination without disassembling the accessory device. These disadvantages are avoided in the new device according to present invention.

It was the object of our Invention to find an arrangement by which the phase of the grating pattern can be changed very rapidly (it must be possible to detect at least 30 individual images per second). This object was met by combining the plane plate micrometer, known per se, with a rotary scanner. This makes it possible to change the phase of the pattern with one and the same optical part in an extremely short time and with very high precision without causing further influences on the beam path. In this case, any errors which might occur can be compensated as systematic errors.

In the arrangement described in the Application, the attainable speed is increased in that the movable wedge need only be rotated by a small angle to achieve the desired change in the projection direction. Further, the change in the projection direction does not require a separate drive; rather, this object is met by suitable control of the scanner in connection with a mechanical flipflop.

It is not the object of the present invention to expand a confocal scanning microscope, but rather to transform a normal brightfield or fluorescence microscope with a normal light source into a confocal microscope with a minimum of changes.

It is an object of the present invention to find an arrangement by which the phase of the grating pattern can be changed very rapidly (it should be possible to detect at least 30 individual images per second). This object was met by combining the plane plate micrometer, known per se, with a rotary scanner. This makes it possible to change the phase of the pattern with one and the same optical part in an extremely short time and with very high precision without causing further influences on the beam path. In this case, any errors which might occur can be compensated as systematic errors.

DESCRIPTION OF THE PREFERRED EMBODIMENTS

A grating G preferably having a $\cos^2$-shaped brightness curve is fixedly installed in a slide, not shown, which can be inserted into the field diaphragm plane of a microscope, not shown.

Due to a favorable compromise between good reconstruction of the intensity curve in the signal and high depth selectivity, the grating constant is adapted in such a way that a grating period occurs on approximately 8–12 pixels of a CCD camera. (Under these conditions, the modulation depth is safely represented with 95% of the actual value).

Figure 1A:
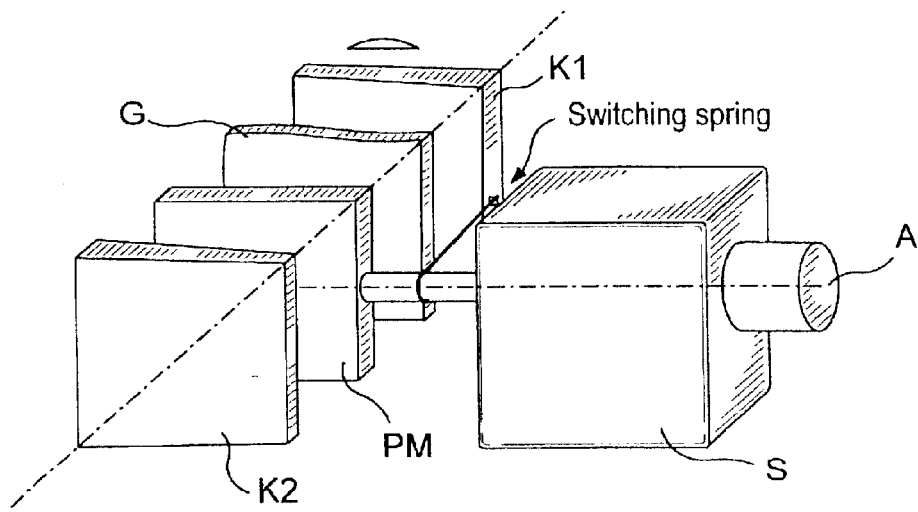
FIG. 1a illustrates a parallel-plate micrometer which is driven in a stepwise manner by a scanner S.

In FIG. 1a, a parallel-plate micrometer PM which is driven in a stepwise manner by a scanner S (e.g., galvanometer scanner) so as to tilt about an axis of rotation A is arranged between the grating and a collimator lens, not shown, of the illuminator. The scanner is controlled in such a way that adjustments of the grating which are shifted in each instance by ¼ of the grating constant are carried out in the object plane by tilting the parallel plate 3–4. Only a portion of the scanning range of the scanner, e.g., 30%, is utilized.

A weak wedge K1 (prism body) is arranged so as to be rotatable against two stops between the grating and the aperture diaphragm, not shown. Another almost identical wedge K2 is arranged in a stationary manner between the parallel-plate micrometer PM and subsequent optics, not shown. The action of the two wedges is adapted via the respective wedge angle in such a way that, by superposition with wedge K1 contacting the first stop, the image of the aperture diaphragm is shifted in a first direction vertical to the grating lines and, when the other stop is contacted, the image of the aperture diaphragm is shifted by the same amount in the opposite direction.

Figure 2:
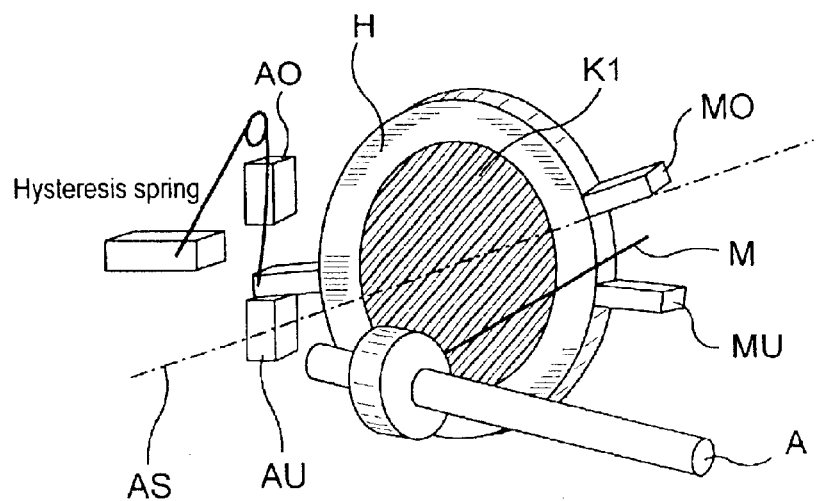
FIG. 2 illustrates that, after 3–4 adjustments, the scanner moves into proximity to an end position and switches the movable wedge in one of the two end positions by a switching or reversing spring. it is held in this position by a mechanical flip-flop.
Figure 3:
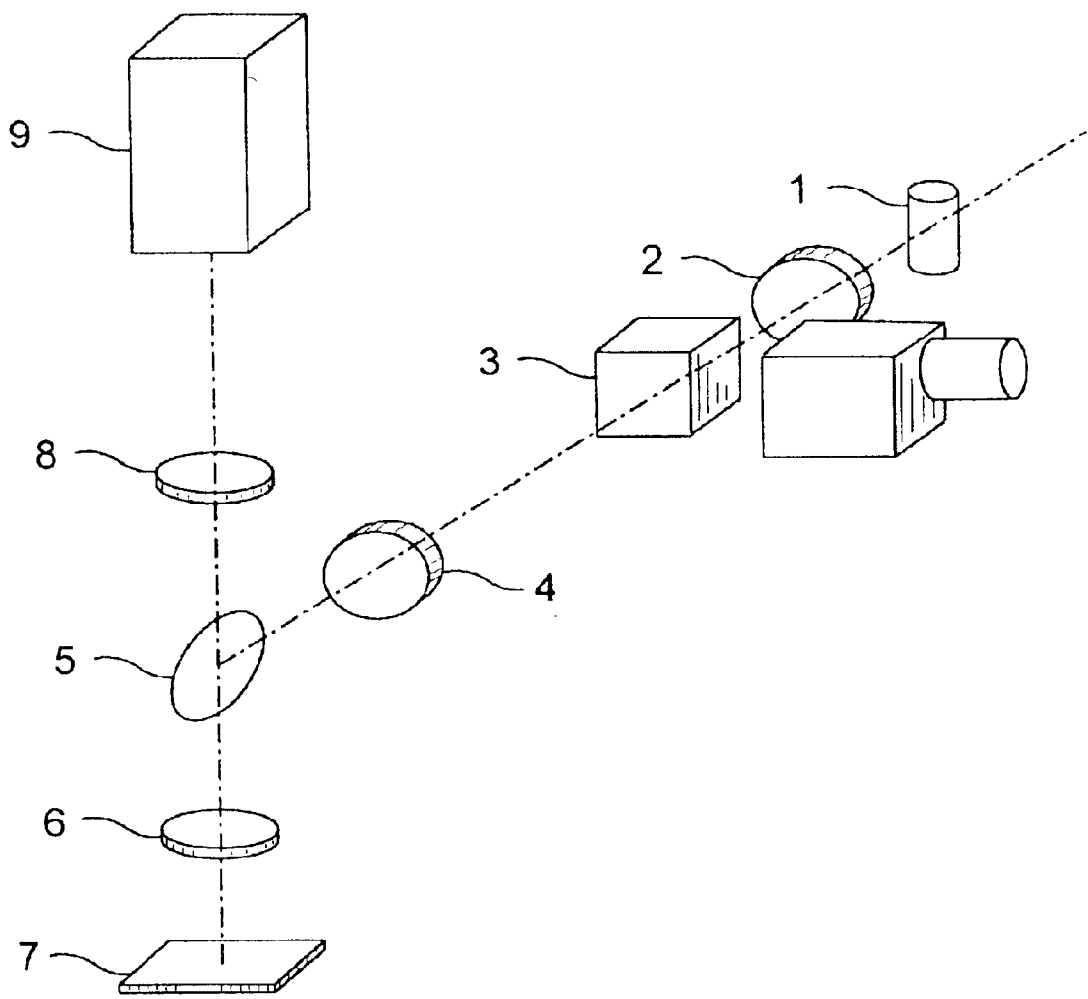
FIG. 3 is a possible arrangement according to the present invention showing CCD camera 9.

After 3–4 adjustments have been carried out, the scanner moves into proximity to an end position and switches the movable wedge into one of the two end positions by a switching spring or reversing spring. It is held in this position by a mechanical flip-flop (similar to a light switch). This is shown in FIG. 2.

The wedge K1 is arranged so as to be rotatable about the optical axis AS in a holder H (tiltable in two directions). The scanner axle A has a driver M which only acts on the holder via an upper or lower driver MO, MU after an end position has been reached and causes the holder to be changed between the upper and lower stop AO, AU.

Figure 1B:
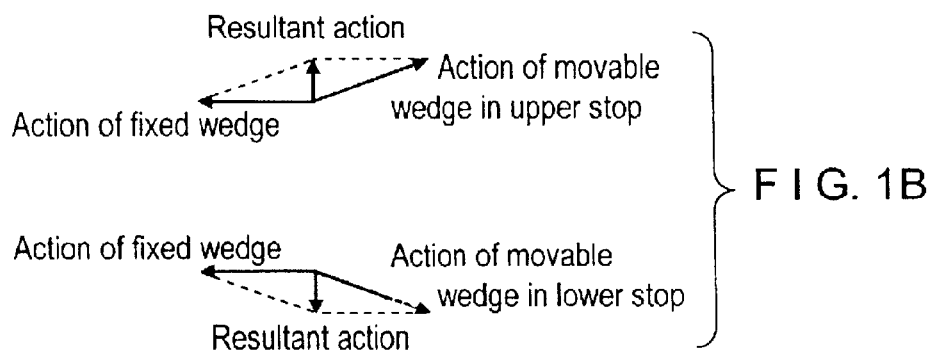
FIG. 1b illustrates schematically that the stationary wedge and movable wedge generate an effect resulting in a shifting in the aperture diaphragm off-center in the objective pupil in a direction vertical to the grating lines.

The stationary wedge and movable wedge generate an effect resulting in a shifting of the aperture diaphragm off-center in the objective pupil in a direction vertical to the grating lines as is shown schematically in FIG. 1b. This generates oblique illumination in one direction.

In another phase of the process, the scanner moves into proximity to the other end position, so that the movable wedge is switched against the other stop and oblique illumination is generated with opposite incidence.

For evaluation without oblique illumination, which is also possible, the movable wedge is held in the center position by means of a lock, so that there is no offset of the image of the aperture diaphragm in the outlet pupil of the microscope objective.

The switching of the different adjustments can be carried out very quickly (within approximately 2–5 ms). The accuracy of the movement easily achieves the required precision of approximately $\frac{1}{1000}$ of the grating constant (otherwise, unwanted stripe structures occur in the evaluated image, usually at 2 to 4 times the spatial frequency of the grating).

Figure 4:
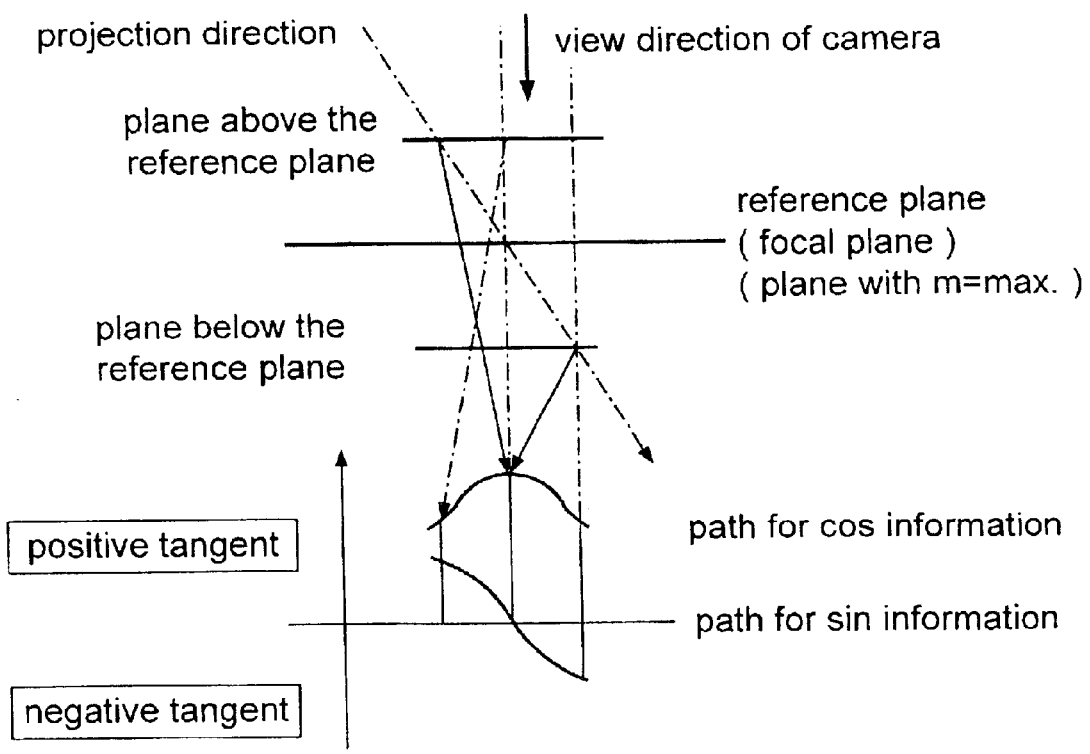
FIG. 4 is a graph of the reference information regarding a proportionality factor of the present invention.

The acquisition of image data requires a pixel-synchronous CCD camera. In general, a data length of 8 bits is sufficient. The linearity of the CCD camera is generally not sufficient to generate image reconstructions without harmonics. As in the AXIOMAP, this deficiency can be overcome by means of a lockup table. The CCD camera 9 is shown in FIG. 4. Also shown are light source 1, collector lens 2, grating/wedge/scanner combination 2, collimator lens 4, beam splitter 5, microscope objective 6, object 7, and tube lens 8. As shown in FIG. 4, the process for determining surface information by a projected structure with periodically changing brightness curve further comprising steps of: shifting by 1/n, where n is a variable greater than two, of the grating constant, acquiring the projection image by a CCD camera, determining information for every image point, which information represents the brightfield intensity multiplied by the respective grating phase, the sine components and cosine components are extracted from these images and gives: I. $I_{xy}=I_{obxy}*m*\sin x$, II. $I_{xy}=I_{obxy}*m*\cos x$, and obtaining phase information $\phi_{xy}$ from I. and II. by division so as to associate the respective pixel above or below the focal plane:

$$\varphi_{xy} = \arctan\frac{\sin x}{\cos x}$$

and wherein that structure is projected on the object surface at an angle of the principle beam other than 90°.

While the foregoing description and drawings represent the present invention, it will be obvious to those skilled in the art that various changes may be made therein without departing from the true spirit and scope of the present invention.

What is claimed is:

1. The process for determining surface information by a projected structure with periodically changing brightness curve comprising steps of:

shifting by 1/n, where n is a number greater than two, of the grating constant, acquiring the projection image by a CCD camera, determining information for every image point, which information represents the brightfield intensity multiplied by the respective grating phase, the sine components and cosine components being extracted from these images and giving:
I. $I_{xy}=I_{obxy}*m*\sin x$
II. $I_{xy}=I_{obxy}*m*\cos x$,
and obtaining phase information $\phi_{xy}$ from I. and II. by division so as to associate the respective pixel above or below the focal plane:

$$\varphi_{xy} = \arctan\frac{\sin x}{\cos x}$$

and wherein the structure is projected on the object surface at an angle of the principle beam other than 90°.

2. The process for determining surface information by a projected structure with periodically changing brightness curve which is shifted by ¼ of the grating constant, and the structure is projected at an angle not equal to 90 degrees, wherein 4 images are recorded for illumination at opposite equal projection angles described, respectively, as:

1. $I_{xy1}=0.51_{obxy}*(1m*\sin x)$
2. $I_{xy2}=0.51_{obxy}*(1m*\cos x)$
3. $I_{xy3}=0.51_{obxy}*(1m*\sin x)$
4. $I_{xy4}=0.51_{obxy}*(1m*\cos x)$, where $I_{xy1}, I_{xy2}, I_{xy3}$ and $I_{xy4}$ represent respectivelY first, second, third and fourth of the 4 images, wherein 3 is subtracted from 1 and 4 is subtracted from 2, so that I, II occur as I. $I_{xy}=I_{obxy}*m*\sin x$
II. $I_{xy}=I_{obxy}*m*\cos x$, and the phase information $\phi_{xy}$ is obtained from I. and II. by division so as to associate the respective pixel above or below the focal plane:

$$\varphi_{xy} = \arctan\frac{\sin x}{\cos x}.$$

3. A process for determining surface information of a sample using a projected structure with periodically changing brightness curve, the process comprising:

shifting by 1/n, where n is a number greater than two, of a grating constant, acquiring the projection image by an image capturing device, determining information for every image point from the acquired image, which information represents the brightfield intensity multiplied by the respective grating phase, the sine components and cosine components being extracted from these images and giving:
I. $I_{xy}=I_{obxy}*m*\sin x$
II. $I_{xy}=I_{obxy}*m*\cos x$, where m is a modulation factor and $I_{obxy}$ is the intensity contributed by the sample at image point (x,y), and obtaining phase information $\phi_{xy}$ from I. and 11. so as to determine whether the respective pixel lies above or below the focal plane according to the following:

$$\varphi_{xy} = \arctan\frac{\sin x}{\cos x}$$

and wherein the structure is projected on the sample at an oblique angle of a principle beam.

4. The process according to claim 3, wherein the determination of whether the respective pixel lies above or below the focal plane is made using the sign of the phase, and the image capturing device is a CCD camera.

5. A process for determining surface information of a sample using a projected structure with periodically changing brightness curve which is shifted by ¼ of the grating constant, and the structure is projected at an oblique angle, wherein 4 images are recorded for illumination at opposite equal projection angles described, respectively, as:

1. $I_{xy1}=0.51_{obxy}*(1m*\sin x)$
2. $I_{xy2}=0.51_{obxy}*(1m*\cos x)$
3. $I_{xy3}=0.51_{obxy}*(1m*\sin x)$
4. $I_{xy4}=0.51_{obxy}*(1m*\cos x)$, where m represents a modulation factor, and $I_{xy1}, I_{xy2}, I_{xy3}$ and $I_{xy4}$ represent respectively first, second, third and fourth of the 4 images, subtracting 3. from 1. and subtracting 4. from 2. to obtain I., II. below, I. $I_{xy}=I_{obxy}*m*\sin x$
II. $I_{xy}=I_{obxy}*m*\cos x$, and obtaining the phase information $\phi_{xy}$ from I. and II. so as to determine whether the respective pixel lies above or below the focal plane according to the following:

$$\varphi_{xy} = \arctan\frac{\sin x}{\cos x}.$$

* * * * *